United States Patent [19]
Michishita et al.

[11] Patent Number: 6,097,534
[45] Date of Patent: Aug. 1, 2000

[54] OPTICAL AMPLIFIER SYSTEM GENERATING HIGH OPTICAL OUTPUT LEVEL

[75] Inventors: Yukio Michishita; Satoshi Ishii, both of Tokyo, Japan

[73] Assignee: NEC Corporation, Tokyo, Japan

[21] Appl. No.: 08/985,049

[22] Filed: Dec. 4, 1997

[30] Foreign Application Priority Data

Dec. 5, 1996 [JP] Japan .................................. 8-324918

[51] Int. Cl.⁷ ....................................................... H01S 3/00
[52] U.S. Cl. ........................................... 359/341; 359/124
[58] Field of Search ..................... 359/341, 124

[56] References Cited

U.S. PATENT DOCUMENTS

| | | | |
|---|---|---|---|
| 5,268,786 | 12/1993 | Matsushita et al. | 359/341 |
| 5,392,154 | 2/1995 | Chang et al. | 359/341 |
| 5,452,116 | 9/1995 | Kirkby et al. | 359/124 |
| 5,675,432 | 10/1997 | Kosaka | 359/341 |
| 5,889,610 | 3/1999 | Fatehi et al. | 359/341 |

FOREIGN PATENT DOCUMENTS

| | | |
|---|---|---|
| 2-5948 | 1/1990 | Japan . |
| 2-282229 | 11/1990 | Japan . |
| 3-252627 | 11/1991 | Japan . |
| 3-269522 | 12/1991 | Japan . |
| 4-101124 | 4/1992 | Japan . |
| 5-130032 | 5/1993 | Japan . |
| 8-97771 | 4/1996 | Japan . |
| 8-204636 | 8/1996 | Japan . |
| 8-278523 | 10/1996 | Japan . |
| 9-45977 | 2/1997 | Japan . |
| 10-13357 | 1/1998 | Japan . |
| 10-93164 | 4/1998 | Japan . |
| 10-150413 | 6/1998 | Japan . |

OTHER PUBLICATIONS

K. Okamoto et al., "Silica–Based Planar Lightwave Circuits for WDM Systems", OFC '95 Technical Digest, ThB1, pp. 224–225.

K. Okamoto, et al., "Silica–Based Planar Lightwave Circuits for WDM Systems", OFC '95 Technical Digest, ThB1, pp. 224–225.

*Primary Examiner*—Mark Hellner
*Attorney, Agent, or Firm*—Ostrolenk, Faber, Gerb & Soffen, LLP

[57] ABSTRACT

An optical amplifier system includes a branching filter for branching into respective wavelengths a wavelength-multiplexed incident light having wavelengths $\lambda_1$ to $\lambda_n$, which is inputted from an input port. N optical amplifier sections respectively amplify the branched lights of respective wavelengths. An optical multiplexer multiplexes the amplified lights having the wavelengths $\lambda_1$ to $\lambda_n$ before outputting the light to an output port. An output control circuit sets the output level of the optical amplifier section to an arbitrary value. With this composition, the present invention is capable of increasing the optical output level per wavelength, independently of the wavelength multiplex number n, when a light signal having n wavelengths is to be amplified.

5 Claims, 3 Drawing Sheets

OPTICAL AMPLIFIER SYSTEM GENERATING HIGH OPTICAL OUTPUT LEVEL

BACKGROUND OF THE INVENTION

The present invention relates to an optical amplifier system for amplifying a light wherein a plurality of lights having different wavelengths are wavelength-multiplexed, and more particularly to an optical amplifier system for wavelength-multiplexed lights requiring a high output per wavelength.

DESCRIPTION OF THE RELATED ART

Currently, in different research institutes, the wavelength multiplex transmission technology, for transmitting lights of different wavelengths in a lump, is attracting interest and studied as a means for ultra high speed and large capacity communication.

FIG. 1 illustrates the basic composition of an optical amplifier section 1 of a conventional optical amplifier system.

In this figure, an Er dope fiber (EDF) 2 absorbs a pumping light entering through a wavelength multiplex (WDM) coupler 3 from a pumping light source 6 and amplifies a signal light inputted from an input port. An optical isolator 4 is interposed in order to prevent a reflected light from an output port from returning to the EDF 2. On the other hand, a part of optical output from the output port is branched by a branching coupler 5, and a light receiving element 7 monitors the optical output level to control an output control circuit 8. The output control circuit 8 controls the output from the pumping light source 6 so that the optical output level can become constant.

When a light signal multiplexed with n different wavelengths ($\lambda_1$ to $\lambda_n$) is inputted into a wavelength multiplex optical amplifier system of such a conventional example, this inputted wavelength multiplex light light is amplified in a lump and outputted to the output port.

In the optical amplifier system of the conventional example mentioned above, as the signal light of n wavelengths is amplified in a lump, the optical output level per wavelength will be 1/n of the maximum output level of the optical amplifier system. As a consequence, the optical output level per wavelength is reduced inconveniently, as the wavelength multiplex number n increases.

SUMMARY OF THE INVENTION

It is an object of the present invention to provide an optical amplifier system for performing wavelength multiplexing and amplification with a high output level wherein the optical output level per wavelength is independent of the wavelength multiplex number n.

It is another object of the present invention to simply realize this optical amplifier system by using the conventional light amplifier system.

In order to achieve the above objects, in accordance with the present invention, the optical amplifier system is provided with a wave branching means for branching into respective wavelengths an incident light wherein a plurality of lights having the wavelengths of $\lambda_1$ to $\lambda_n$ (n is any natural number) are wavelength-multiplexed, n optical amplifier means for respectively amplifying the lights of the respective wavelengths branched by the branching means, an optical multiplexer for multiplexing the lights having the wavelengths of $\lambda_1$ to $\lambda_n$ amplified by the n optical amplifier means, and a control means for controlling the output levels of the n optical amplifier means.

Moreover, the control means may be composed to set the gain of n optical amplifier means respectively to an arbitrary value.

Furthermore, the optical amplifier means may also be composed to include an amplifier means for amplifying the incident light by using a pumping light, a light receiving means for receiving a part of the amplified light, and a pumping light generation means for generating a pumping light for making constant the level of the light output in accordance with the light level received by the light receiving means.

The above and further objects and the novel feature of the invention will more fully appear from the following detailed description when the same is read in connection with the accompanying drawings. It is to be expressly understood, however, that the drawings are for illustration only and are not intended as a definition of the limits of the invention.

DESCRIPTION OF THE PREFERRED EMBODIMENT

Now, the present invention will be described in more detail with reference to the accompanied drawings.

Figure 2:
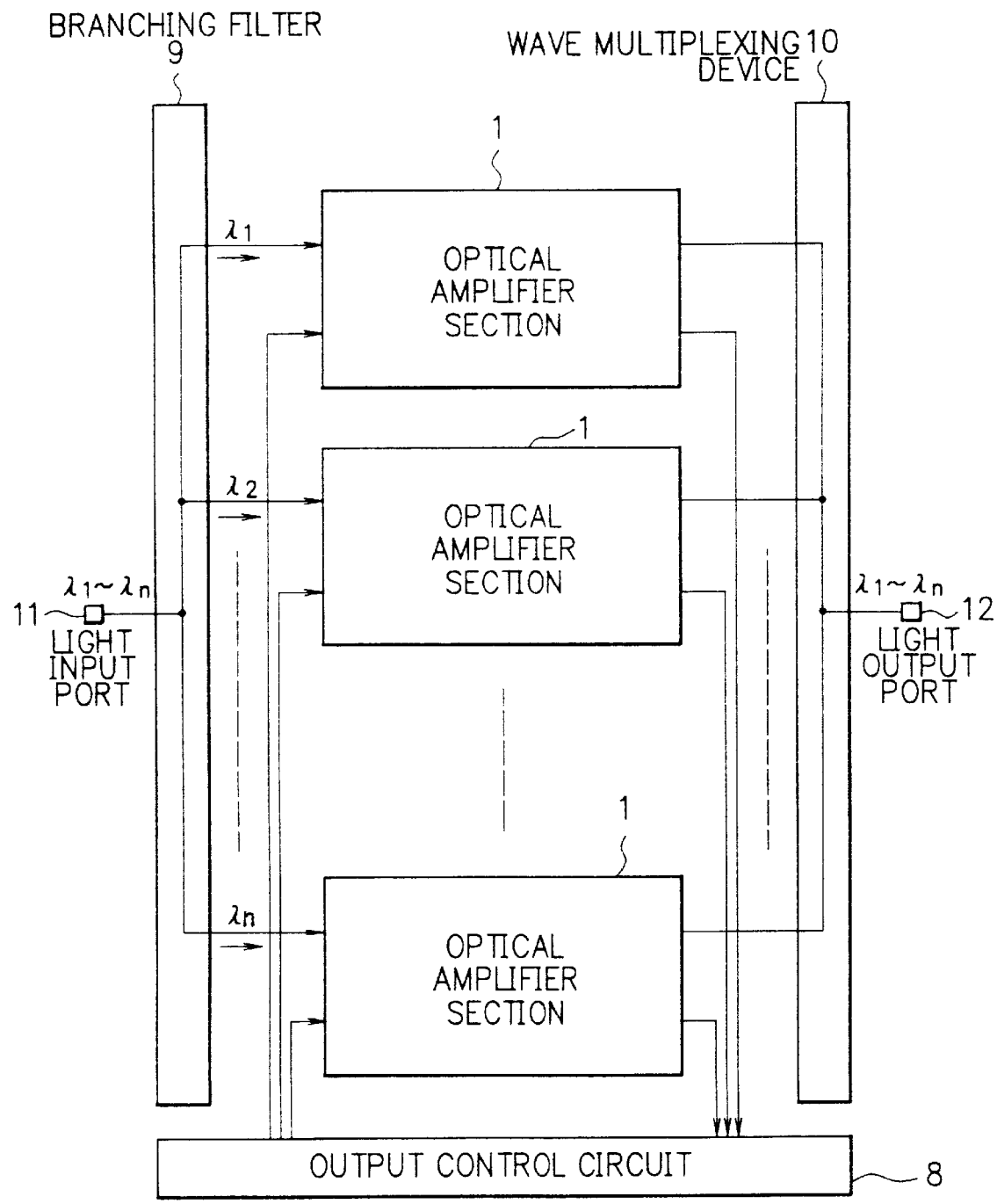
FIG. 2 is a block diagram showing an embodiment of an optical amplifier system according to the present invention.

In FIG. 2, first, a branching filter 9 branches a wavelength-multiplexed light signal light having the wavelengths of $\lambda_1$ to $\lambda_n$, inputted from the input port 11 into respective wavelengths. The respective branched light signal are optically amplified respectively by n optical amplifier sections 1. The optical outputs from these n optical amplifier sections 1 are controlled by the output control circuit 8. The amplified light signals are multiplexed by an optical multiplexer 10, wavelength-multiplexed again into a signal light having the wavelengths of $\lambda_1$ to $\lambda_n$ and outputted from an output port 12.

According to the foregoing, as the light signals of respective wavelengths are amplified for respective wavelengths, an optical signal of higher optical output level than that of the conventional lump amplification can be obtained.

Figure 1:
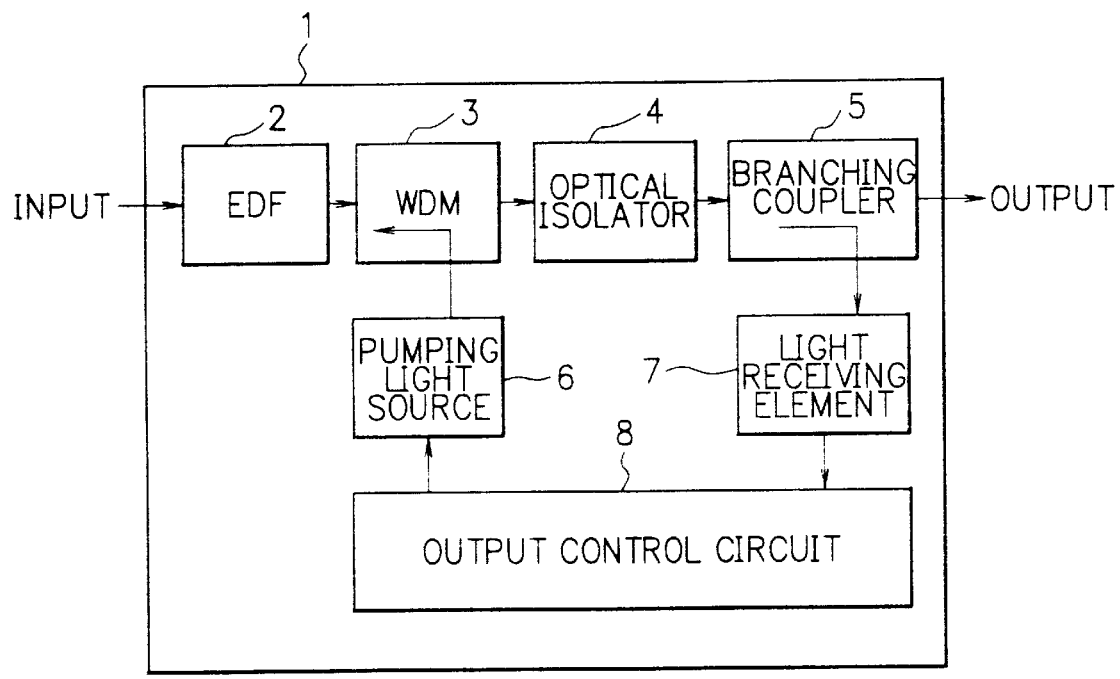
FIG. 1 is a block diagram showing an example of the conventional wavelength multiplex optical amplifier system.
Figure 3:
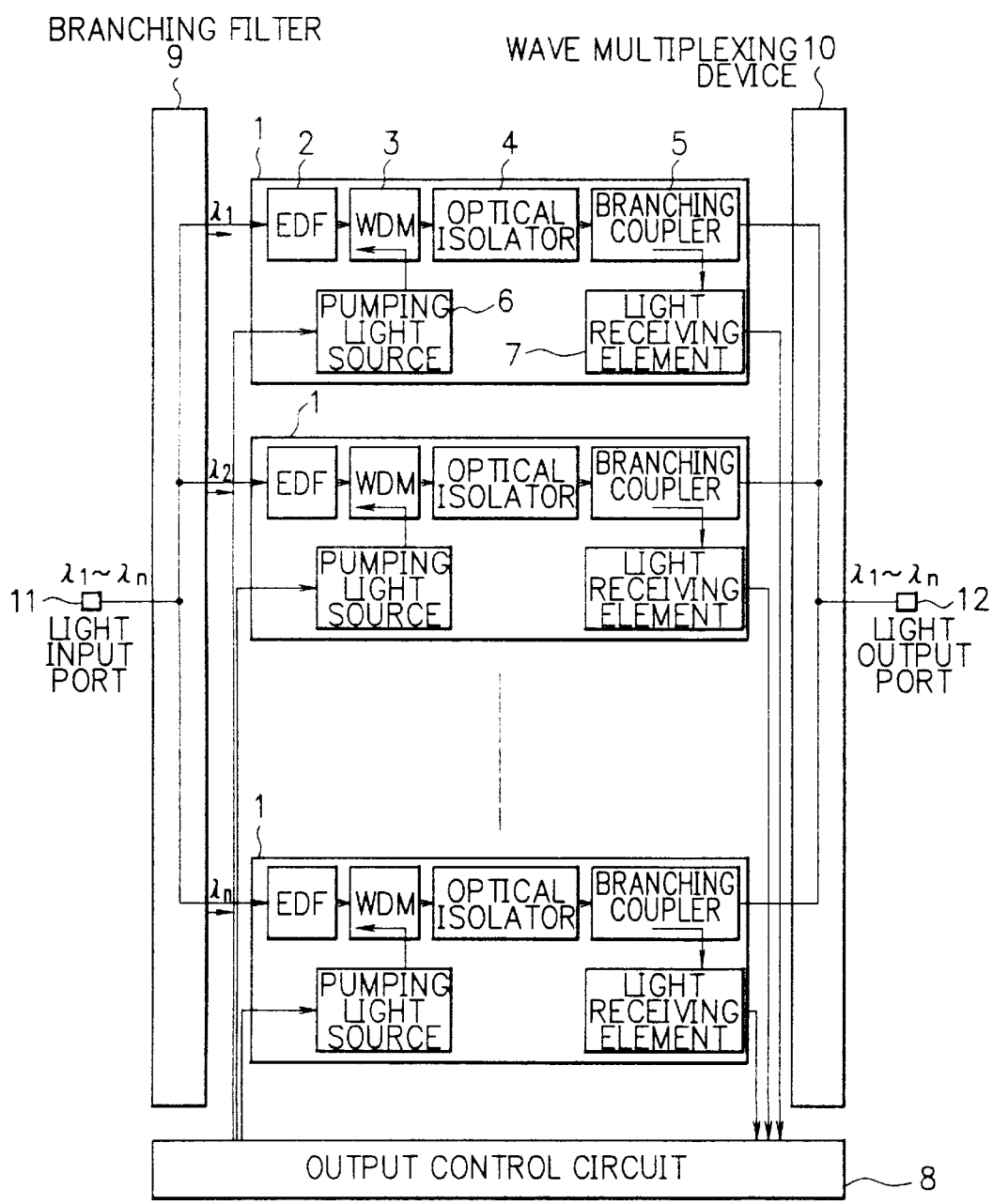
FIG. 3 is a block diagram showing an example of composition of the optical amplifier section illustrated in FIG. 2.

FIG. 3 illustrates an example of composition of the optical amplifier section 1, and sections corresponding to those in FIG. 1 and FIG. 2 are referred by the same reference numbers.

As mentioned hereinbefore, the signal light having the wavelengths $\lambda_1$ to $\lambda_n$ is branched into respective wavelengths by the branching filter 9, and the branched light signals enter n optical amplifier sections 1. In the respective optical amplifier section 1, the signal light enters the EDF 2. The EDF 2 absorbs a pumping light entered through the WDM coupler 3 from the pumping light source 6 to amplify the light signal. The amplified signal light passes through the optical isolator 4, and a part of the same is branched by the branching coupler 5, before entering the optical multiplexer 10.

The optical output level of the branched light signal is monitored by the light receiving element 7, and the output from the pumping light source 6 is controlled by the output control circuit 8 so that the optical output level can be constant. On the other hand, the light signals inputted into the optical multiplexer 10 are multiplexed, wavelength-multiplexed again into a light signal having the wavelengths of $\lambda_1$ to $\lambda_n$ and outputted from the output port 12. Moreover, as the branching filter 9 and the optical multiplexer 10, wavelength multiplex devices such as AWG (arrayed-waveguide-grating multiplexer; OFC'95 Technical Digest, ThB1, pp224–225) or the like, capable of multiplexing or branching with little loss a signal light of multi-wavelength, can be employed.

As described hereinbefore, according to the present invention, as the incident n-wavelength multiplexed light signal is branched into respective wavelengths amplified respectively by n optical amplifier means, and then multiplexed, a higher optical output level than that of the conventional lump amplification can be obtained.

Moreover, by controlling the gain of n optical amplifier means respectively to an arbitrary value, a high output wavelength multiplex optical amplifier wherein the optical output level per wavelength is independent of the wavelength multiplex number n can be realized. This is because the light signals of respective wavelengths are amplified for respective wavelengths.

Furthermore, the optical amplifier means can be realized easily through the application of a conventional optical amplifier, by amplifying the input light with the pumping light by an amplifier means such as the EDF, and at the same time by receiving a part of the amplified light and delivering a signal corresponding to the received light to a control means.

It should be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

What is claimed is:

1. An optical amplifier system comprising:
    a branching filter which branches incident light into a plurality of different wavelength lights, said incident light being composed of a plurality of wavelengths which have been wavelength-multiplexed to form said incident light;
    a plurality of optical amplifiers, matching in number said plurality of different wavelength lights, which amplify said different wavelength lights branched by said branching filter;
    an optical multiplexer which multiplexes said plurality of different wavelength lights amplified by said optical amplifiers; and
    a controller which individually controls the output level of each optical amplifier.

2. An optical amplifier system according to claim 1, wherein said controller respectively sets the gain of each of said amplifiers to an arbitrary value.

3. An optical amplifier system according to claim 1, wherein each optical amplifier comprises:
    an amplifier which amplifies the incident light by using a pumping light, thereby producing amplified light;
    a light receiver which receives a part of said amplified light; and
    a pumping light source which generates said pumping light, in response to said part of said amplified light, so as to make the level of said amplified light constant.

4. A method of amplifying an input light composed of a plurality of source lights of different wavelengths, said method comprising:
    branching said input light into said plurality of source lights;
    amplifying each source light individually under control of a controller, thereby producing individually amplified source lights; and
    multiplexing said amplified source lights.

5. The method as claimed in claim 4, wherein said amplifying comprises:
    amplifying said incident light using a pumping light source thereby producing amplified light;
    receiving part of said amplified light by said controller; and
    controlling said pumping light source, by said controller, so that the level of said amplified light is constant.

* * * * *